United States Patent
Baek et al.

(10) Patent No.: US 7,251,206 B2
(45) Date of Patent: Jul. 31, 2007

(54) OPTICAL SIGNAL CONVERTER AND METHOD OF CONTROLLING AMPLIFICATION GAIN ACCORDING TO ROTATING SPEED OF OPTICAL DISC

(75) Inventors: Chang-hoon Baek, Daegu Metropolitan (KR); Chul-ho Jeon, Suwon-si (KR); Seung-man Han, Suwon-si (KR); Sung-du Kwon, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 554 days.

(21) Appl. No.: 10/786,173

(22) Filed: Feb. 26, 2004

(65) Prior Publication Data

US 2004/0264328 A1   Dec. 30, 2004

(30) Foreign Application Priority Data

Feb. 27, 2003   (KR) .................... 10-2003-0012357

(51) Int. Cl.
   *G11B 7/00* (2006.01)
(52) U.S. Cl. .............. 369/53.2; 369/53.37; 369/124.11
(58) Field of Classification Search .................. None
   See application file for complete search history.

(56) References Cited

U.S. PATENT DOCUMENTS

| | | | |
|---|---|---|---|
| 4,580,255 A | 4/1986 | Inoue et al. | |
| 5,005,163 A | 4/1991 | Yamamoto et al. | |
| 5,045,812 A * | 9/1991 | Tateishi | 331/10 |
| 6,298,024 B1 * | 10/2001 | Nomura | 369/53.22 |
| 6,407,977 B1 * | 6/2002 | Kang | 369/124.01 |
| 6,480,042 B2 * | 11/2002 | Kadowaki | 327/103 |
| 6,597,644 B1 * | 7/2003 | Kang | 369/44.35 |

FOREIGN PATENT DOCUMENTS

| | | |
|---|---|---|
| EP | 0 420 591 A2 | 4/1991 |
| EP | 0 420 591 A3 | 4/1991 |
| JP | 2001-187842 | 7/2000 |
| KR | 2002-0057462 | 7/2002 |

OTHER PUBLICATIONS

Notice of Office Action issued by the Korean Patent Office on Mar. 29, 2005.

* cited by examiner

*Primary Examiner*—William Korzuch
*Assistant Examiner*—Christopher Lamb
(74) *Attorney, Agent, or Firm*—Staas & Halsey LLP

(57) ABSTRACT

An optical signal converter and a method or controlling an amplification gain according to a rotating speed of an optical disc. An optical signal detector detects an optical signal reflected from an optical disc in a reproduction mode and converts the detected optical signal into an electrical signal. A gain control signal generator generates a gain control signal when a voltage level of a driving signal used to drive the optical disc exceeds a maximum output voltage of the optical signal converter. A gain switcher selects an amplification gain of the optical signal converter in response to the gain control signal and an external control signal. A signal amplifier amplifies a signal output from the optical signal detector in response to an output signal of the gain switcher.

16 Claims, 3 Drawing Sheets

OPTICAL SIGNAL CONVERTER AND METHOD OF CONTROLLING AMPLIFICATION GAIN ACCORDING TO ROTATING SPEED OF OPTICAL DISC

CROSS-REFERENCE TO RELATED APPLICATIONS

This application claims the priority of Korean Patent Application No. 2003-12357, filed on Feb. 27, 2003, in the Korean Intellectual Property Office, the disclosure of which is incorporated herein by reference.

BACKGROUND OF THE INVENTION

1. Field of the Invention

The present invention relates to an optical signal converter for converting an optical signal into an electrical signal, and more particularly, to an optical signal converter and a method of controlling an amplification gain according to a rotating speed of an optical disc reproducing apparatus or an optical disc reproducing and recording apparatus.

2. Description of the Related Art

FIG. 1 shows a conventional optical signal converter. Referring to FIG. 1, a conventional optical signal converter 101 includes an optical signal detector 111, a signal amplifier 121, and a gain switcher 131.

The optical signal detector 111 detects an optical signal reflected from an optical disc in a reproduction mode and converts the detected optical signal into an electrical signal.

The signal amplifier 121 amplifies a signal output from the optical signal detector 111. In this case, a rate of amplifying an optical signal is differently applied by an output of the gain switcher 131 that controls an amplification gain of the optical signal converter 101 according to a rotating speed of an optical disc. Here, the rotating speed of the optical disc is different according to types of optical discs.

Likewise, the conventional optical signal converter 101 uses a method of changing a reproduction mode into a gain mode according to types of optical discs. A speed at which data is recorded on an optical disc is gradually increased. Also, an optical power should be increased so that a data recording speed is increased.

However, even though the optical power is increased so as to record data on the optical disc at a high rotating speed, since an amplification gain of the optical signal converter 101 is fixed, an output of the conventional optical signal converter 101 is saturated.

FIGS. 2A and 2B are waveform diagrams showing input and output signals of the conventional optical signal converter 101. As shown in FIG. 2A, when the optical power is increased so as to drive the optical disc at a high rotating speed and a signal V1 reflected from the optical disc and input into the optical signal converter 101 exceeds a maximum output voltage $V_{max}$ of the optical signal converter 101, since the amplification gain of the optical signal converter 101 is fixed, an output signal $V_{out}$ of the conventional optical signal converter 101 is saturated at a value $V_a$ (211) as shown in FIG. 2B, and an optical device having the optical signal converter 101 malfunctions.

SUMMARY OF THE INVENTION

The present invention provides an optical signal converter which prevents an output signal from being saturated due to a high optical power when data is recorded on an optical disc at a high rotating speed.

The present invention also provides a method of controlling an amplification gain of an optical signal converter which prevents an output signal from being saturated due to a high optical power when data is recorded on an optical disc at a high rotating speed.

According to an aspect of the present invention, an optical signal converter comprises an optical signal detector, which detects an optical signal reflected from an optical disc in a reproduction mode and converts the detected optical signal into an electrical signal; a gain control signal generator, which generates a gain control signal when a voltage level of a driving signal used to drive the optical disc exceeds a maximum output voltage of the optical signal converter; a gain switcher, which selects an amplification gain of the optical signal converter in response to the gain control signal and an external control signal; and a signal amplifier, which amplifies a signal output from the optical signal detector in response to an output signal of the gain switcher.

According to another aspect of the present invention, the gain control signal generator comprises a comparator, which compares the voltage level of the driving signal used to drive the optical disc with a maximum output voltage of the optical signal converter and generates a predetermined signal when the voltage level of the driving signal exceeds the maximum output voltage of the optical signal converter; and a gain control signal generator, which generates the gain control signal and controls an amplification gain of a signal amplified by the signal amplifier when the predetermined signal is generated.

According to another aspect of the present invention, a method of controlling an amplification gain of an optical signal converter comprises determining whether a current mode is a reproduction mode; if the current mode is the reproduction mode, detecting a rotating speed of an optical disc; comparing a driving signal used to drive the optical disc with a maximum output voltage of the optical signal converter; and if a voltage level of the driving signal used to drive the optical disc is higher than the maximum output voltage of the optical signal converter, controlling an amplification gain of the optical signal converter.

According to the present invention, an optical device having an optical signal converter performs a normal operation even though an optical power is increased.

Additional aspects and/or advantages of the invention will be set forth in part in the description which follows and, in part, will be obvious from the description, or may be learned by practice of the invention.

BRIEF DESCRIPTION OF THE DRAWINGS

The above and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
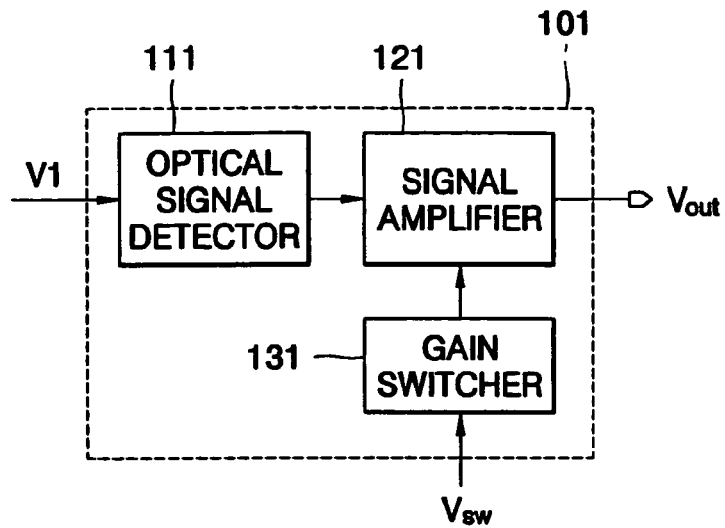
FIG. 1 shows a conventional optical signal converter.
Figure 2A:
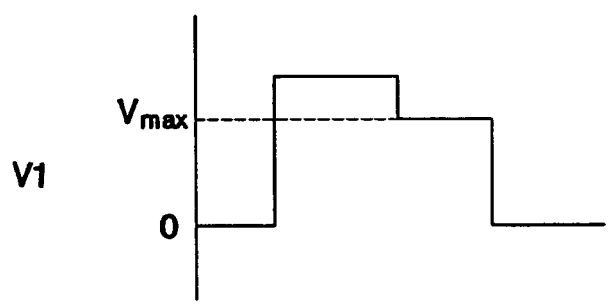
FIG. 2A is a waveform diagram showing a signal input to the optical signal converter shown in FIG. 1, when an optical disc operates at a high rotating speed.
Figure 2B:
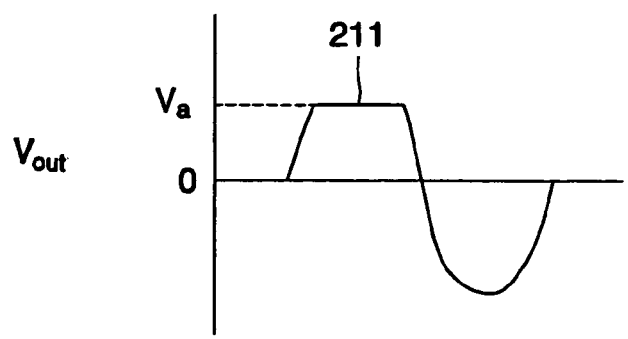
FIG. 2B is a waveform diagram showing an output signal of the optical signal converter shown in FIG. 1 in response to the input signal shown in FIG. 2A.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 3:
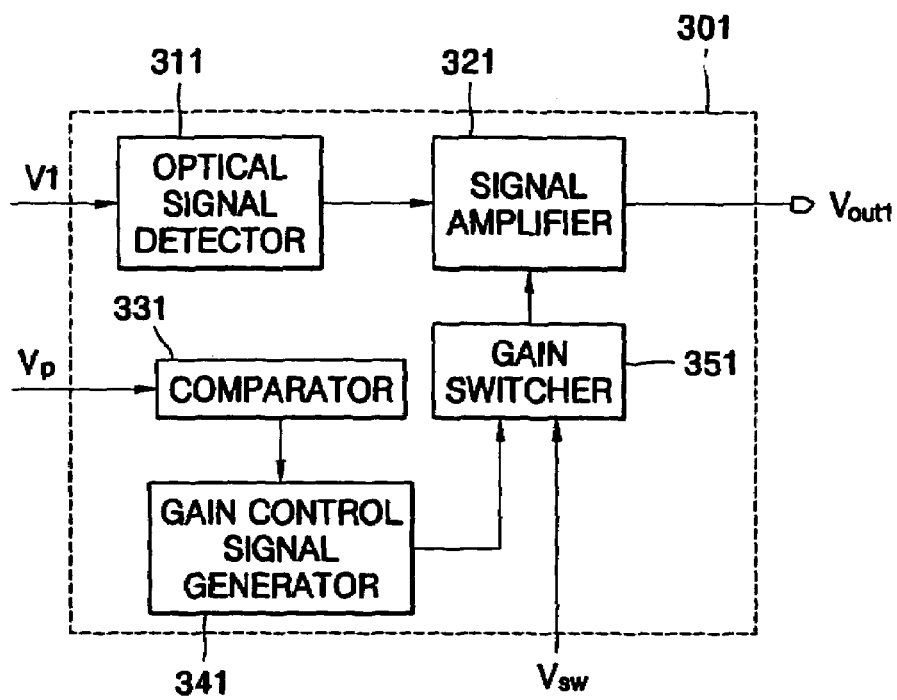
FIG. 3 is a block diagram showing an optical signal converter according to an embodiment of the present invention.

FIG. 3 is a block diagram showing an optical signal converter according to an embodiment of the present invention. Referring to FIG. 3, an optical signal converter 301 comprises an optical signal detector 311, a signal amplifier 321, a comparator 331, a gain control signal generator 341, and a gain switcher 351.

The optical signal detector 311 detects an optical signal V1 reflected from an optical disc in a reproduction mode and converts the detected optical signal V1 into an electrical signal. The optical signal detector 311 comprises a plurality of photo diodes. The signal amplifier 321 amplifies the electrical signal output from the optical signal detector 311.

The comparator 331 inputs a driving signal $V_p$ used to drive the optical disc in the reproduction mode and compares the driving signal with a maximum output voltage ($V_{max}$) of the optical signal converter 301. As a result, when a voltage level of the driving signal exceeds $V_{max}$, a predetermined signal is generated. When the voltage level of the driving signal is lower than $V_{max}$, the predetermined signal is not generated.

When the predetermined signal is generated in the comparator 331, the gain control signal generator 341 generates a gain control signal in response to the predetermined signal and controls an amplification gain of the signal amplified by the signal amplifier 321 via the gain switcher 351.

The gain switcher 351 receives the gain control signal and an external control signal $V_{sw}$ and controls a gain of the signal amplifier 321. The gain switcher 351 has three gain modes, for example, a high gain mode, a mid-gain mode, and a low gain mode. The high gain mode is useable for DVD-RAMs or RW discs, the mid-gain mode is useable for CD-ROMs or DVD-ROM discs, and the low gain mode is useable for CD-R or RW discs.

The gain switcher 351 selects one of the three gain modes according to a voltage level of the external control signal $V_{SW}$. For example, when the external control signal $V_{SW}$ is 2.5 V, the high gain mode is selected. When the external control signal $V_{SW}$ is 0 V, the mid-gain mode is selected. When the external control signal $V_{SW}$ is 5 V, the low gain mode is selected. A voltage level of the external control signal may be differently set by a user.

When the gain control signal is generated in the gain control signal generator 341, the gain switcher 351 reduces the amplification gain of the signal amplifier 321.

The optical signal converter 301 may be implemented in one semiconductor chip and may be separately composed only of the comparator 331 and the gain control signal generator 341 such that a gain control signal as an output signal of the gain control signal generator 341 may be applied to the gain switcher 351.

Figure 4A:
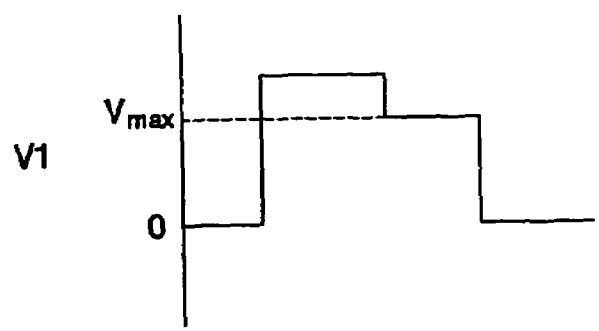
FIG. 4A is a waveform diagram showing a signal input to the optical signal converter shown in FIG. 3, when an optical disc operates at a high rotating speed.
Figure 4B:
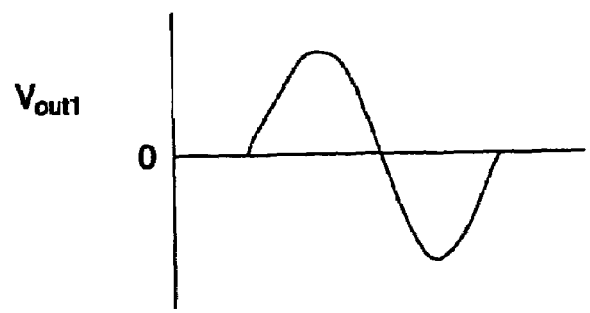
FIG. 4B is a waveform diagram showing an output signal of the optical signal converter shown in FIG. 3 in response to the input signal shown in FIG. 4A.

FIGS. 4A and 4B are waveform diagrams showing input and output signals V1 and $V_{out1}$, respectively, of the optical signal converter 301 shown in FIG. 3, when an optical disc operates at a high rotating speed. Referring to FIGS. 4A and 4B, even though the optical disc operates at a high rotating speed and the signal V1 as shown in FIG. 4A having a high optical power is input, the signal $V_{out1}$ output from the optical signal converter 301 as shown in FIG. 4B is not saturated but is output as a normal signal such that an optical device having the optical signal converter 301 does not malfunction.

Figure 5:
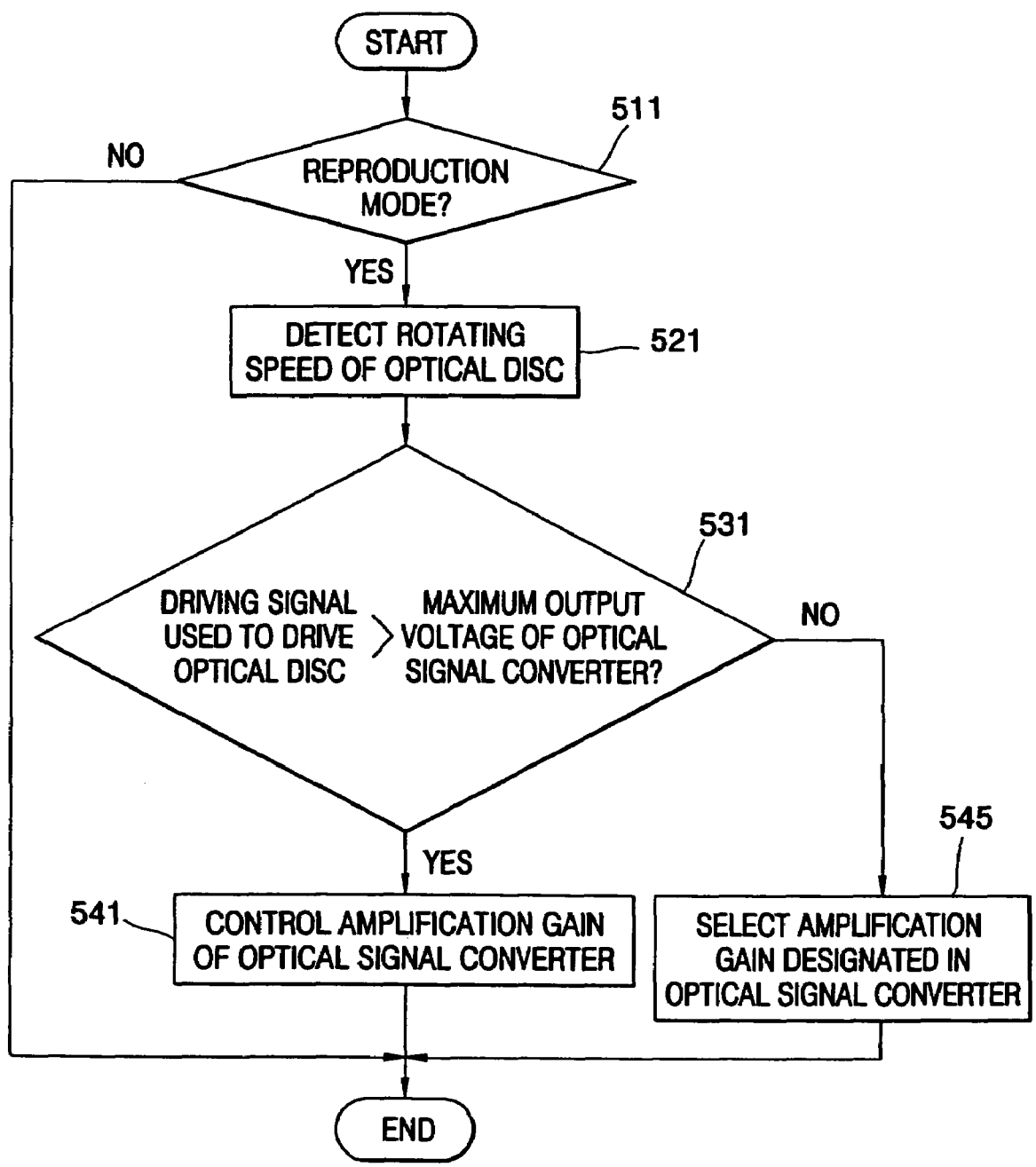
FIG. 5 is a flowchart showing a method of controlling an amplification gain of the optical signal converter according to the present invention.

FIG. 5 is a flowchart showing a method of controlling an amplification gain of the optical signal converter according to the present invention. Referring to FIG. 5, the method of controlling an amplification gain of the optical signal converter comprises operations 511, 521, 531, 541, and 545. The method of controlling an amplification gain of the optical signal converter shown in FIG. 5 will be described with reference to FIG. 3.

In operation 511, whether a current mode is a reproduction mode is determined. If the current mode is the reproduction mode, an optical signal is reflected from an optical disc and input into the optical signal converter 301.

In operation 521, a rotating speed of the optical disc in the reproduction mode is detected. The rotating speed of the optical disc is detected by a system controller (not shown) provided in an optical device having the optical signal converter 301 and is transmitted to the optical signal converter 301. In other words, a driving signal $V_p$ used to drive the optical disc is input into the optical signal converter 301.

In operation 531, the driving signal $V_p$ used to drive the optical disc is compared with a maximum output voltage of the optical signal converter 301. A driving signal $V_p$ of the optical disc is a voltage signal.

In operation 541, when the voltage level of the driving signal $V_p$ used to drive the optical disc is higher than the maximum output voltage of the optical signal converter 301, an amplification gain of the optical signal converter 301 is controlled. In this case, an amplification degree of the optical signal V1 reflected from the optical disc is reduced, and the output voltage $V_{out1}$ of the optical signal converter 301 is not saturated but is output as a normal signal.

In operation 545, when the voltage level of the driving signal $V_p$ used to drive the optical disc is lower than the maximum output voltage of the optical signal converter 301, the optical signal V1 is accordingly amplified according to one of a plurality of gain modes determined by a user and not controlled based on the comparison.

As described above, in the optical signal converter 301 according to the present invention, even though an optical power is increased so as to operate an optical disc at a high rotating speed, an output voltage $V_{out1}$ is not saturated such that an optical device having the optical signal converter 301 does not malfunction.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An optical signal converter comprising:
   an optical signal detector, which detects an optical signal reflected from an optical disc in a reproduction mode and converts the detected optical signal into an electrical signal;
   a gain control signal generator, which generates a gain control signal when a voltage level of a driving signal used to drive the optical disc exceeds a maximum output voltage of the optical signal converter;
   a gain switcher, which selects an amplification gain of the optical signal converter in response to the gain control signal and an external control signal; and
   a signal amplifier, which amplifies the electrical signal output from the optical signal detector in response to an output signal of the gain switcher.

2. The optical signal converter of claim 1, wherein the gain control signal generator comprises:
   a comparator, which compares the voltage level of the driving signal used to drive the optical disc with the maximum output voltage of the optical signal converter and generates a predetermined signal when the voltage level of the driving signal exceeds the maximum output voltage of the optical signal converter; and
   a gain control signal generator, which generates the gain control signal and controls an amplification gain of a signal amplified by the signal amplifier when the predetermined signal is generated.

3. The optical signal converter of claim 1, wherein the gain switcher selects one of a high gain mode, a mid-gain mode, and a low gain mode based on a mode control signal.

4. The optical signal converter of claim 3, wherein when the gain control signal is generated, the gain switcher reduces the amplification gain of the signal amplifier.

5. The optical signal converter of claim 3, wherein the gain switcher selects the high gain mode for use with a DVD-RAM disc or an RW disc.

6. The optical signal converter of claim 3, wherein the gain switcher selects the mid-gain mode for use with a CD-ROM or a DVD-ROM.

7. The optical signal converter of claim 3, wherein the gain switcher selects the low gain mode for use with a CD-RW disc or an RW disc.

8. A method of controlling an amplification gain of an optical signal converter, the method comprising:
   determining whether a current mode is a reproduction mode;
   if the current mode is the reproduction mode, detecting a rotating speed of an optical disc;
   comparing a driving signal used to drive the optical disc with a maximum output voltage of the optical signal converter; and
   if a voltage level of the driving signal used to drive the optical disc is higher than the maximum output voltage of the optical signal converter, controlling an amplification gain of the optical signal converter.

9. The method of claim 8, wherein if the voltage level of the driving signal used to drive the optical disc is lower than the maximum output voltage of the optical signal converter, one of a plurality of gain modes designated by a user is used and the amplification gain is not controlled based on the comparison.

10. The method of claim 9, wherein the plurality of gain modes designated by the user comprise a high gain mode, a mid-gain mode, and a low gain mode.

11. The optical signal converter of claim 10, wherein the high gain mode is used with a DVD-RAM disc or an RW disc.

12. The optical signal converter of claim 10, wherein the mid-gain mode is used with a CD-ROM or a DVD-ROM.

13. The optical signal converter of claim 10, wherein the low gain mode is used with a CD-RW disc or an RW disc.

14. An optical signal converter comprising:
    an optical signal detector which detects an optical signal reflected from an optical disc in a reproduction mode and converts the detected optical signal into an electrical signal;
    a signal amplifier which amplifies the electrical signal according to an amplification gain;
    a gain control signal generator, which generates a first control signal when a voltage level of a driving signal used to drive the optical disc exceeds a predetermined value; and
    a gain switcher which generates a second control signal to control the amplification gain of the signal amplifier in response to the first control signal and a third control signal which designates an initial amplification gain.

15. The optical signal converter of claim 14, wherein a value of the third control signal corresponds to a type of the optical disc.

16. The optical signal converter of claim 14, wherein the second control signal controls the signal amplifier to reduce the amplification gain in response to the first control signal.

* * * * *

UNITED STATES PATENT AND TRADEMARK OFFICE
CERTIFICATE OF CORRECTION

| | | |
|---|---|---|
| PATENT NO. | : 7,251,206 B2 | Page 1 of 1 |
| APPLICATION NO. | : 10/786173 | |
| DATED | : July 31, 2007 | |
| INVENTOR(S) | : Chang-hoon Baek et al. | |

It is certified that error appears in the above-identified patent and that said Letters Patent is hereby corrected as shown below:

Title Page, Column 2 item 57 (Abstract), Line 1, change "or" to --of--.

Signed and Sealed this

Eighteenth Day of December, 2007

JON W. DUDAS
*Director of the United States Patent and Trademark Office*